United States Patent
Bolte et al.

(12)

(10) Patent No.: US 6,515,164 B1
(45) Date of Patent: Feb. 4, 2003

(54) LOW MONOMER POLYURETHANE PREPOLYMER AND PROCESS THEREFORE

(75) Inventors: Gerd Bolte, Monheim (DE); Guenter Henke, Neuss (DE); Markus Kruedenscheidt, Langenfeld (DE); Astrid Omoruyi, Duesseldorf (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/341,080

(22) PCT Filed: Dec. 18, 1997

(86) PCT No.: PCT/EP97/07131

§ 371 (c)(1),
(2), (4) Date: Jul. 2, 1999

(87) PCT Pub. No.: WO98/29466

PCT Pub. Date: Jul. 9, 1998

(30) Foreign Application Priority Data

Jan. 2, 1997 (DE) .......................................... 197 00 014

(51) Int. Cl.[7] ..................... C07C 269/02; C07C 271/06; C08G 18/10; C08G 18/72; C09J 175/04

(52) U.S. Cl. ................. 560/25; 252/182.2; 252/182.21; 252/182.22; 156/331.4; 156/331.7; 528/59; 528/60; 528/61; 528/65; 528/66; 528/67; 528/76; 528/80; 528/85; 560/26; 560/115; 560/158; 560/330; 560/336; 560/358; 560/359; 560/360

(58) Field of Search ......................... 252/182.2, 182.21, 252/182.22; 528/59, 60, 61, 65, 66, 67, 76, 80, 85; 560/25, 26, 115, 330, 158, 336, 358, 359, 360; 156/331.4, 331.7

(56) References Cited

U.S. PATENT DOCUMENTS 4,038,239 A * 7/1977 Coyner et al. ............... 524/872
4,487,910 A   12/1984 Bauriedel .................... 528/65
4,544,763 A   10/1985 Narayan ...................... 560/26
4,623,709 A   11/1986 Bauriedel .................... 528/65
4,814,103 A * 3/1989 Potter et al. ............. 252/182.22

FOREIGN PATENT DOCUMENTS

| DE | 2559759 | 10/1977 |
| EP | 5473 | 11/1979 |
| EP | 0 118 065 | 9/1984 |
| EP | 0 150 444 | 8/1985 |

OTHER PUBLICATIONS

Deutsche Lebensmittel–Rundschan, vol. 87 (1991), pp. 280 and 281.

* cited by examiner

*Primary Examiner*—Rabon Sergent
(74) *Attorney, Agent, or Firm*—Stephen D. Harper; Daniel S. Ortiz

(57) ABSTRACT

A low-monomer PU prepolymer containing free NCO groups which is obtained from polyhydric alcohols and diisocyanates differing in their reactivity and which is distinguished by the ratio of the NCO groups of the partly slower-reacting diisocyanate to the NCO groups of the faster-reacting diisocyanate. It is greater than 6:1. Nevertheless the prepolymer according to the invention cures more quickly than a known prepolymer predominantly containing fast-reacting NCO groups. In a preferred embodiment, TDI is used as the partly slower-reacting diisocyanate while MDI is used as the faster-reacting diisocyanate. The prepolymer is produced in two stages. The prepolymer according to the invention is suitable for bonding plastic articles, metals and paper, especially films. The accelerated absence of migration is particularly noticeable in this regard.

18 Claims, No Drawings

LOW MONOMER POLYURETHANE PREPOLYMER AND PROCESS THEREFORE

BACKGROUND OF THE INVENTION

1. Field of the Invention

This invention relates to a low-monomer PU prepolymer containing free NCO groups obtainable from polyhydric alcohols and diisocyanates differing in their reactivity, to its production and to its use.

2. Discussion of the Related Art

PU prepolymers of the type in question are described in EP 0 150 444.
They are produced by a process in which
  in a first reaction step, toluene-2,4-diisocyanate is reacted with polyhydric alcohols in an OH:NCO ratio of 4 to 0.55:1 in the absence of other diisocyanates and, after virtually all the NCO groups of relatively high reactivity have reacted off with some of the OH groups present,
  a symmetrical dicyclic diisocyanate, which is more reactive than the sluggishly reacting NCO groups of the toluene-2,4-diisocyanate from reaction step 1, is added in a second reaction step in an equimolar quantity or in excess, based on free OH groups, or in a quantity of 5 to 80% by weight, based on the total quantity of diisocyanates in steps 1 and 2,
optionally at elevated temperature and/or in the presence of typical catalysts. Although this known PU prepolymer has a low monomer content, i.e. only 1 to 2.5% according to the Examples, it does not cure sufficiently quickly in many cases.

Accordingly, the problem addressed by the present invention was to provide a low-monomer PU prepolymer containing free NCO groups which would allow quicker but sufficiently safe processing.

SUMMARY OF THE INVENTION

The solution provided by the invention is defined in the claims and consists in a low-monomer PU prepolymer containing free NCO groups which is obtainable from polyhydric alcohols and at least two diisocyanates differing in their reactivity and which is characterized in that the ratio of the NCO groups of the partly slower-reacting diisocyanate to the NCO groups of the faster-reacting diisocyanate is greater than 6:1.

The ratio between the isocyanate groups is preferably greater than 10:1 and, above all, greater than 15:1.

DETAILED DESCRIPTION OF THE INVENTION

Various polyhydric alcohols may be used. Aliphatic alcohols containing 2 to 4 hydroxyl groups per molecule are suitable. Primary and secondary alcohols may be used, secondary alcohols being preferred. In particular, the reaction products of low molecular weight polyhydric alcohols with alkylene oxides containing up to 4 carbon atoms may be used. For example, the reaction products of ethylene glycol, propylene glycol, the isomeric butanediols or hexanediols with ethylene oxide, propylene oxide and/or butylene oxide are suitable. In addition, the reaction products of trihydric alcohols, such as glycerol, trimethylol ethane and/or trimethylol propane, or higher alcohols, for example pentaerythritol or sugar alcohols, with the alkylene oxides mentioned may be used.

Polyether polyols with a molecular weight of 100 to 10,000 and preferably 1,000 to 5,000, more especially polypropylene glycol, are particularly suitable. Thus, addition products of only a few moles of ethylene oxide and/or propylene oxide per mole or addition products of more than 100 moles of ethylene oxide and/or propylene oxide with low molecular weight polyhydric alcohols may be used according to the required molecular weight. Other polyether polyols may be obtained by condensation of, for example, glycerol or pentaerythritol with elimination of water. In addition, polyols widely used in polyurethane chemistry are obtained by polymerization of tetrahydrofuran. Among the polyether polyols mentioned, the reaction products of polyhydric low molecular weight alcohols with propylene oxide under conditions where at least partly secondary hydroxyl groups are formed are particularly suitable. Other suitable polyether polyols are described, for example, in DE-OS 2 559 759.

Polyester polyols having a molecular weight of 200 to 10,000 are also suitable for the process according to the invention. A first embodiment is characterized by the use of polyester polyols formed by reaction of low molecular weight alcohols, more particularly ethylene glycol, propylene glycol, glycerol or trimethylol propane, with 1 to 50 moles of caprolactone. Other suitable polyester polyols can be obtained by polycondensation. Thus, dihydric and/or trihydric alcohols may be condensed with less than the equivalent quantity of dicarboxylic acids and/or tricarboxylic acids or reactive derivatives thereof to form polyester polyols. Suitable dicarboxylic acids for this condensation reaction are succinic acid and higher homologs thereof containing up to 12 carbon atoms, unsaturated dicarboxylic acids, such as maleic acid or fumaric acid, and aromatic dicarboxylic acids, more particularly the isomeric phthalic acids. Suitable tricarboxylic acids include citric acid and trimellitic acid. Polyester polyols of the above-mentioned dicarboxylic acids and glycerol, which have a residual content of secondary OH groups, are particularly suitable for the purposes of the invention.

Polyols based on polycarbonates may also be used. Polycarbonates may be obtained, for example, by the reaction of diols, such as propylene glycol, butane-1,4-diol or hexane-1,6-diol, diethylene glycol, triethylene glycol to tetraethylene glycol, or mixtures of two or more of these diols with diaryl carbonates, for example diphenyl carbonate or phosgene.

Other suitable polyol components are OH-containing polyacrylates. These polyacrylates can be obtained, for example, by polymerization of ethylenically unsaturated monomers containing an OH group. Monomers such as these may be obtained, for example, by the esterification of ethylenically unsaturated carboxylic acids and dihydric alcohols, the alcohol generally being present in a slight excess. Ethylenically unsaturated carboxylic acids suitable for the esterification are, for example, acrylic acid, methacrylic acid, crotonic acid or maleic acid. Corresponding OH-containing esters are, for example, 2-hydroxyethyl acrylate, 2-hydroxyethyl methacrylate, 2-hydroxypropyl acrylate, 2-hydroxypropyl methacrylate, 3-hydroxypropyl acrylate or 3-hydroxypropyl methacrylate or mixtures of two or more thereof.

Finally, the polyols may also be based on polybutadiene, styrene/butadiene rubber or nitrile rubber.

In the context of the invention, the expression "two diisocyanates differing in their reactivity" applies to two different diisocyanates differing in their reactivity to alcohols. In selecting these different diisocyanates, the following observations should be taken into account: in the reaction of diisocyanates with alcohols, the reaction rate of the first diisocyanate group is considerably higher than that of the second diisocyanate group. This applies in particular to monocyclic diisocyanates and also to other diisocyanates containing groups in different chemical environments, i.e. generally speaking to non-symmetrical diisocyanates. It has also been found that dicyclic diisocyanates or, more generally, symmetrical diisocyanates have a higher reaction rate than the second isocyanate group of non-symmetrical or monocyclic diisocyanates.

Accordingly, the first diisocyanate is a non-symmetrical diisocyanate containing two NCO groups differing in their reactivity. Specific examples are toluene-2,4-diisocyanate (TDI), isophorone diisocyanate and 2,4-diphenyl methane diisocyanate. The second diisocyanate is a symmetrical isocyanate, preferably a dicyclic diisocyanate. It is important that the reactivity of its isocyanate groups to hydroxyl groups is higher than that of the terminal isocyanate groups of the non-symmetrical diisocyanate reacted on one side (reactive diluent). Accordingly, diaryl diisocyanates are especially suitable, 4,4'-diphenyl methane diisocyanate (MDI) and/or substituted 4,4-diphenyl methane diisocyanates, for example, being preferred.

The concentration of the NCO groups differing in their reactivity in the prepolymer according to the invention is determined by nuclear resonance spectroscopy (NMR).

By "low-monomer" is meant a low concentration of the starting diisocyanates. Their concentration is below 2, preferably below 1 and, more preferably, below 0.5% by weight, based on the prepolymer. The concentration is determined by gas chromatography or HPLC.

The PU prepolymer according to the invention is produced by a process in which in a first reaction step, the diisocyanates containing NCO groups differing in their reactivity (non-symmetrical diisocyanates) are reacted with polyhydric alcohols in an OH:NCO ratio of 4 to 0.55:1 and, after virtually all the fast NCO groups have reacted off with some of the OH groups present, a diisocyanate (symmetrical diisocyanate) more reactive than the slowly reacting NCO groups of the isocyanate from reaction step 1 is added in a second reaction step in less than the equivalent quantity, based on free OH groups, optionally at elevated temperatures and/or in the presence of typical catalysts.

According to the invention, therefore, a polyhydric alcohol is reacted with the non-symmetrical diisocyanate in an OH:NCO ratio of 4 to 0.55:1 in a first reaction step until the more reactive NCO groups of the diisocyanate have reacted almost completely with some of the OH groups available, but the slowly reacting groups have not yet reacted to any significant extent, if at all. This point of the reaction can be determined by analytically following the course of the reaction. The course of the reaction may be followed by spectroscopy (IR) or by titrimetry. In the process according to the invention, the molar ratios used are selected so that free OH groups are still present after the more reactive isocyanate groups have reacted off.

In the second reaction step, a symmetrical diisocyanate is introduced into the low-viscosity reaction mixture obtained in the first reaction step, this symmetrical diisocyanate being selected for its higher reactivity by comparison with the now polymer-bound NCO groups of the non-symmetrical diisocyanate.

In simple terms, it may be said that, according to the invention, in a low-viscosity reaction medium containing OH-functional and NCO-functional constituents, a reaction is carried out between the OH-functional constituents and a symmetrical diisocyanate to form a polyurethane prepolymer.

In the process according to the invention, the product of the first reaction step is used as a reactive diluent without any reaction taking place between the OH groups and the slowly reacting polymer-bound NCO groups of the non-symmetrical diisocyanate.

To obtain reaction products of a non-symmetrical diisocyanate, more particularly toluene-2,4-diisocyanate, with polyhydric alcohols which, according to the invention, may be used as solvent or "reactive diluent" in the second reaction step, it is important to maintain a certain ratio between hydroxyl groups and isocyanate groups. Thus, suitable products which still contain OH groups after the more reactive NCO groups have reacted off are formed when the number of OH groups divided by the number of isocyanate groups is between 4 and 0.55 and preferably between 1 and 0.6.

To carry out the second stage of the process according to the invention, symmetrical, more particularly dicyclic, diisocyanates are reacted with the remaining OH groups in the OH— and NCO-functional reaction products of the first stage as reactive diluents. For the second-stage reaction, the molar ratio of OH groups, expressed as the quotient of the OH groups divided by isocyanate groups, is more than 1.0 and preferably 1.1 to 12, based on remaining OH groups.

To carry out the process according to the invention, the diisocyanates are preferably reacted with polyhydric alcohols at elevated temperature. Temperatures of 40 to 120° C. are suitable, temperatures of 80 to 95° C. being preferred. For laboratory batches (ca. 1 kg), a reaction time of about 1 hour for the first stage and 2 to 20 hours for the second stage has proved to be of advantage. The temperature in both stages is of the order of 80° C. At all events, the end of the reaction is reached when there is no further reduction in the number of isocyanate groups. This may be determined analytically by titrating the isocyanate groups and is the case, for example, after 2 hours to 5 days at room temperature.

The PU prepolymer thus produced is used—preferably together with typical hardeners and/or moisture, if desired in the presence of organic solvents and typical accelerators—for bonding plastic articles and metals, particularly films, preferably at temperatures of 20 to 120° C.

Hardeners in the context of the invention are understood to be low molecular weight or oligomeric polyfunctional compounds which are selected in regard to the type and number of functional groups so that they react with the isocyanate groups of the prepolymer and crosslink them. The hardeners preferably contain amino, carboxylic acid and epoxide groups.

Coupling agents may also be used, in particular to improve resistance to chemicals and resistance to fillings or contents in the case of metals. Specific examples of coupling agents are titanates and Si compounds, more particularly siloxanes.

The PU prepolymer according to the invention is distinguished by the following positive or advantageous properties:

Only 7 days as opposed to 14 days are required for curing at room temperature and normal atmospheric humidity. This result is surprising because the PU prepolymer according to the invention actually contains fewer reactive NCO groups than the known PU prepolymer according to EP 150 444.

Early adhesive strength—at 1.6 N/15 mm—is distinctly higher than in the case of the known PU prepolymer where it is less than 0.3 to 0.6 N/15 mm. Early strength was measured under the following conditions: A 15 mm wide laminate strip is subjected to a T-peel test immediately after bonding (peeling angle 2×90°, peeling rate 100 nm/minute).

The monomer content of unreacted diisocyanates is well below 15% by weight.

the non-volatile diisocyanate content is also lower, as reflected in the accelerated absence of migration. In the system according to the invention, it is reached after only 4 days whereas, in the known system, it takes 10 to 14 days to achieve. Absence of migration is determined as follows (see Deutsche Lebensmittel-Rundschau 87 (1991), pages 280 and 281). A welded flat bag is filled with 3% acetic acid and stored at 70° C. The contents of the bag are diazotized after storage for 2 h, subjected to azo coupling and concentrated in a $C_{18}$ column. The concentration is then photometrically determined. The migration of non-volatile diisocyanates and other compounds can lead to problems, for example in the sealing of bonded film laminates, particularly CPA/EVA laminates.

The increase in viscosity at 70° C. as a function of time is much flatter in the case of the PU prepolymers according to the invention than in the case of the known PU prepolymer. This flatter pot-life curve makes processing easier by ensuring a longer processing time.

The prepolymers according to the invention are suitable as such or in the form of solutions in organic solvents for bonding plastics, metals and paper, but especially for laminating textiles, aluminium and plastic films and metal- or oxide-coated films and papers. Conventional hardeners, for example polyhydric alcohols of relatively high molecular weight may be added (two-component systems) or surfaces of defined moisture content may be directly bonded using the products according to the invention. Film laminates produced with the products according to the invention are characterized by high processing safety during heat sealing. This may possibly be attributable to the greatly reduced content of migratable low molecular weight products in the prepolymers. In addition, the prepolymers according to the invention may also be used as extrusion, printing and metallizing primers and for heat sealing.

The invention is illustrated by the following Examples.

COMPARISON EXAMPLE

In a three-necked flask equipped with a stirrer, thermometer and drying tube, 411.7 g of a polypropylene glycol (OH value 109 mg KOH/g) were mixed with 104.4 g of toluene-2,4-diisocyanate and the resulting mixture was heated with stirring. Half an hour after reaching a melt temperature of 90° C., an NCO value of 4.56% was measured by titration. This was only just below the theoretical value of 4.88%. After addition of 25 g of 4,4'-diphenyl methane diisocyanate, the reaction mixture was stirred for 2 hours at 90° C., after which an NCO content of 4.61% was measured (theoretical 4.65%).

| | |
|---|---|
| % monomeric TDI: 0.03 | % NCO = 4.7 (theoretical 4.77) |
| % monomeric MDI: 2.5 | OH:NCO (1) = 1:1 |
| viscosity: 1980 mPas/60° C. | OH:NCO (2) = 1:1.6, based on remaining OH from stage 1. |

EXAMPLE 1

(Invention):

In a three-necked flask equipped with a stirrer, thermometer and drying tube, 575.3 9 of a polypropylene glycol (OH value 109 mg KOH/g) and 156.9 g of a polypropylene glycol (OH value 267 mg KOH/g) were mixed with 238.5 g of toluene-2,4-diisocyanate and the resulting mixture was heated with stirring. Half an hour after reaching a melt temperature of 90° C., the NCO content as measured by titration was only just below 4.5%. After addition of 28 g of 4,4'-diphenyl methane diisocyanate, the reaction mixture was stirred for 2 hours at 90° C., after which an NCO content of 4.57% was measured (theoretical 4.59%).

| | |
|---|---|
| % monomeric TDI: 0.03 | % NCO = 4.57 (theoretical 4.59) |
| % monomeric MDI: 0.2 | OH:NCO (1) = 0.68:1 |
| viscosity: 1000 mPas/70° C. | OH:NCO (2) = 10:1, based on remaining OH from stage 1. |

EXAMPLE 2

(Invention):

| Quantities weighed in | |
|---|---|
| 524.0 g polyester | (OH value 137) |
| 106.0 g PPG | (OH value 113) |
| 106.0 g PPG | (OH value 267) |
| 244.0 g TDI | (NCO: 48.0%) |
| 21.0 g MDI | (NCO: 33.5%) |

Method:

Apparatus

Three-necked flask equipped with a contact thermometer, stirrer (+motor), drying tube and heating mushroom.

Procedure:

The polyester and two PPG's were introduced into the flask and homogeneously mixed. The TDI was then added, followed by heating to 50° C. The temperature rose under the effect of the exothermic reaction. The temperature was then kept at 90° C. by cooling.

End point of the reaction at NCO=5.4%.

The MDI was then added, followed by heating to 95° C. The reaction mixture was stirred at that temperature for 1 hour. NCO after 1 hour: 4.3% (theoretical 4.3%)

The hot mixture was packed in containers.

MDI: 0.4% (theoretical <1.0%)

TDI: 0.03% (theoretical <0.1%)

NCO: 4.3

Viscosity:~5,700 mPas [Brookfield DVII (Thermocell/)/ Sp.27/20 r.p.m./70° C.]

Laminate Adhesion

A universal tensile testing machine with a synchronous recorder is required for the measuring diagrams. The force range should be between 10 and 50 N and should be adjusted according to the expected adhesion level.

15 mm wide strips are prepared using a strip cutter. Before the strips are clamped, they are slightly separated. The peeling rate is 100 mm/minute, the peeling angle 90° and the peel length 5 to 10 cm according to the range of variation. The result is expressed as laminate adhesion in N/15 mm and the separation pattern is visually evaluated (adhesive or cohesive failure; adhesive residue).

What is claimed is:

1. A low-monomer polyurethane prepolymer containing free isocyanate groups obtained by reacting one or more polyhydric alcohols and two or more diisocyanates, wherein the polyhydric alcohol is first reacted with at least one non-symmetrical diisocyanate having a first NCO group which has a slower rate of reaction with the polyhydric alcohol than a second NCO group, wherein a ratio of a number of OH groups to a number of first and second NCO groups is form 4:1 to 0.55:1, to form a reaction product having free OH groups and free first NCO groups, and reacting the reaction product with at least one second diisocyanate having NCO groups which have a faster rate of reaction with the polyhydric alcohol than the first NCO groups wherein a ratio of a total number of first and second NCO groups of the non-symmetrical diisocyanate to a number of NCO groups of the second diisocyanate is greater than 6:1 and the second diisocyanate is added in an amount less than an equivalent of free OH groups in the reaction product.

2. The low-monomer polyurethane prepolymer of claim 1 wherein said ratio of the total number of first and second NCO groups to the number of NCO groups of the second diisocyanate is greater than 10:1.

3. The low-monomer polyurethane prepolymer of claim 1 wherein said polyhydric alcohols are selected from the group consisting of primary and secondary aliphatic alcohols containing 2 to 6 hydroxyl groups.

4. The low-monomer polyurethane prepolymer of claim 1 wherein the at least one second diisocyanate having NCO groups which have a faster rate of reaction than the first NCO groups comprise a symmetrical aromatic diisocyanate.

5. The low-monomer polyurethane prepolymer of claim 1 containing free isocyanate groups obtained by reacting one or more polyhydric alcohols selected from the group consisting of primary and secondary aliphatic alcohols containing 2 to 6 hydroxyl groups and two or more diisocyanates, wherein, the at least one second diisocyanate having the NCO group with a faster rate of reaction than the first NCO group comprises a symmetrical aromatic diisocyanate and the ratio of the NCO groups of the non-symmetrical diisocyanate to the NCO groups of the symmetrical aromatic diisocyanate is greater than 10:1.

6. The low-monomer polyurethane prepolymer of claim 5 wherein the ratio of the NCO groups of the non-symmetrical diisocyanate to the NCO groups of the symmetrical aromatic diisocyanate is greater than 15.1.

7. The low-monomer polyurethane prepolymer of claim 5 wherein the polyhydric alcohols are selected from the group consisting of diols containing 2 to 5 carbon atoms, triols containing 3 to 6 carbon atoms, tetraols containing 4 to 8 carbon atoms, OH-functional esters having molecular weights up to 10,000, OH-functional polyethers having molecular weights up to 10,000, and mixtures thereof.

8. The low-monomer polyurethane prepolymer of claim 5 wherein the symmetrical aromatic diisocyanate comprises 4,4' MDI.

9. The low-monomer polyurethane prepolymer of claim 5 wherein the non-symmetrical diisocyanate comprises TDI.

10. A process for producing a low-monomer polyurethane prepolymer containing free isocyanate groups comprising the steps of:

(a) reacting one or more non-symmetrical diisocyanates, each containing a first NCO group which has a slower rate of reaction than a second NCO group, with one or more polyhydric alcohols in an OH:NCO ratio of 4:1 to 0.55:1 until at least substantially all of the second NCO groups, but substantially none of the first NCO groups, have reacted with the OH groups of the polyhydric alcohols to form a reaction product having free OH groups and free first NCO groups;

(b) reacting the reaction product of step (a) with at least one symmetrical diisocyanate, each containing NCO groups which have a faster rate of reaction than the first NCO groups of the non-symmetrical diisocyanates, to form the low-monomer polyurethane prepolymer, wherein said symmetrical diisocyanates are added in an amount less than equivalents of free OH groups present in said reaction product of step (a) and a ratio of a total number of first and second NCO groups of the non-symmetrical diisocyanate to a number of NCO groups of the symmetrical diisocyanate is greater than 6:1.

11. The process of claim 10 wherein steps (a) and (b) are carried out at temperatures of 40° C. to 120° C.

12. The process of claim 10 wherein TDI comprises at least one of the non-symmetrical diisocyanates in step (a).

13. The process of claim 10 wherein 4,4' MDI comprises the at least one symmetrical diisocyanates in step (b).

14. The process of claim 10 wherein the OH:NCO ratio in step (a) is between 1:1 and 0.6:1.

15. A method of bonding two substrates selected from the group consisting of plastic surface articles, metals and paper comprising: applying the prepolymer of claim 1 alone or in a mixture with a hardener to at least one surface of the substrates to be joined; bringing the surfaces of the substrates to be joined together with the prepolymer therebetween; and curing the prepolymer with a hardener, moisture or both to form an adhesive bond between the substrates.

16. The method of claim 15 wherein at least one of the substrates is a film.

17. The method of claim 15 wherein said curing is carried out at a temperature between 20° C. and 120° C.

18. The method of claim 15 wherein the hardener contains at least one functional group selected from the group consisting of amino groups, carboxylic acid groups, alcohol groups and epoxide groups.

* * * * *

UNITED STATES PATENT AND TRADEMARK OFFICE
CERTIFICATE OF CORRECTION

PATENT NO. : 6,515,164 B1
DATED : February 4, 2003
INVENTOR(S) : Bolte et al.

It is certified that error appears in the above-identified patent and that said Letters Patent is hereby corrected as shown below:

<u>Column 7,</u>
Line 17, delete "form", and insert therefor -- from --.
Line 54, delete "15.1.", and insert therefor -- 15:1. --.

Signed and Sealed this

Sixth Day of May, 2003

JAMES E. ROGAN
*Director of the United States Patent and Trademark Office*